United States Patent

Robert et al.

[11] Patent Number: 5,878,343
[45] Date of Patent: Mar. 2, 1999

[54] TELECOMMUNICATIONS SYSTEMS ARRANGEMENT

[75] Inventors: Guy Robert, Kristinehamnsgatan; Stig Morin, Vibblabyvägen; Anders Lundström, Granlidsvägen, all of Sweden

[73] Assignee: Telefonaktiebolaget LM Ericsson, Stockholm, Sweden

[21] Appl. No.: 750,164
[22] PCT Filed: May 31, 1995
[86] PCT No.: PCT/SE95/00619
  § 371 Date: Dec. 2, 1996
  § 102(e) Date: Dec. 2, 1996
[87] PCT Pub. No.: WO95/33348
  PCT Pub. Date: Dec. 7, 1995

[30] Foreign Application Priority Data

May 31, 1994 [SE] Sweden .................................. 9401879

[51] Int. Cl.[6] .................................................... H04Q 7/24
[52] U.S. Cl. ...................... 455/424; 455/426; 455/462; 455/465
[58] Field of Search ..................... 370/466, 467; 455/74, 74.1, 424, 426, 436, 439, 444, 445, 462, 464, 465, 554, 555, 560, 561, 552, 553

[56] References Cited

U.S. PATENT DOCUMENTS 5,353,331  10/1994  Emery et al. ........................ 455/234
5,610,974  3/1997  Lantto ................................... 455/423
5,659,598  8/1997  Byrne et al. ............................ 455/23

FOREIGN PATENT DOCUMENTS 4324094  3/1994  Germany ......................... H04B 7/26

OTHER PUBLICATIONS

Antero Alvesalo, "DECT System as an Extension to GSM Infrastructure", MRC Mobile Radio Conference 1991, Nice, France, Nov. 13–15, 1991, pp. 203/9 – 206.

Wide area mobility for DECT by S. Ghaheri Niri et al.–IEEE proc. pp. 1119–1125, May 1996.

Cordless access to GSM by S. Salmela et al. DMR V Proceedings pp. 93–98, Jan. 12, 1992.

*Primary Examiner*—Wellington Chin
*Assistant Examiner*—Isaak R. Jama
*Attorney, Agent, or Firm*—Burns, Doane, Swecker & Mathis, L.L.P.

[57] ABSTRACT

An arrangement interconnects a first communication system and a second communication system. The first communication system is a cellular mobile communication system. The second communication system is a cordless access system. The systems are connected via an interworking function which is connected to a Mobile Switching Center of the first communication system via an existing interface of the first communication system. The interworking function is connected to an access system of the second communication system via an interface of the second communications system.

28 Claims, 14 Drawing Sheets

FIG.10a
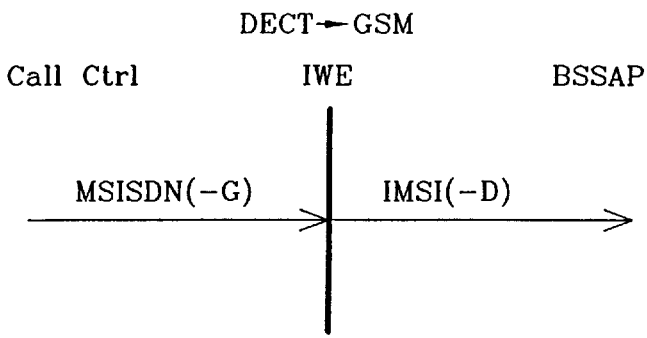
FIG.10b
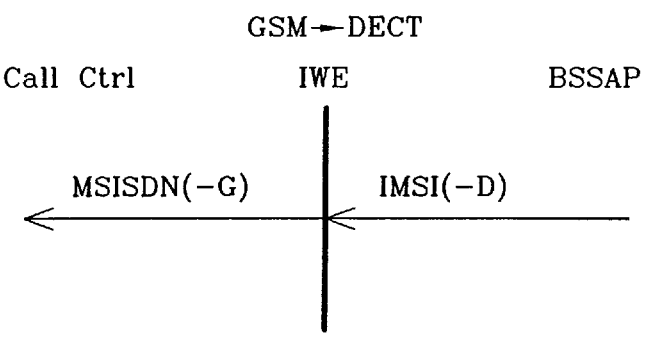
FIG.12a
CFP → IWF
| REX | IWF |
|---|---|
| Calling party Nr (will be MSISDN-G) | IWF maps it to IMSI-D related to MSISIDN-D |
| Called Party Nr: | IWF maps it to Called Party Nr: |
FIG.12b
MSC → IWF
| MSC | IWF |
|---|---|
| IMSI-D | Called Party Nr: (MSISDN-G) |
| Called Party Nr: | IWF maps it to Called Party Nr: |

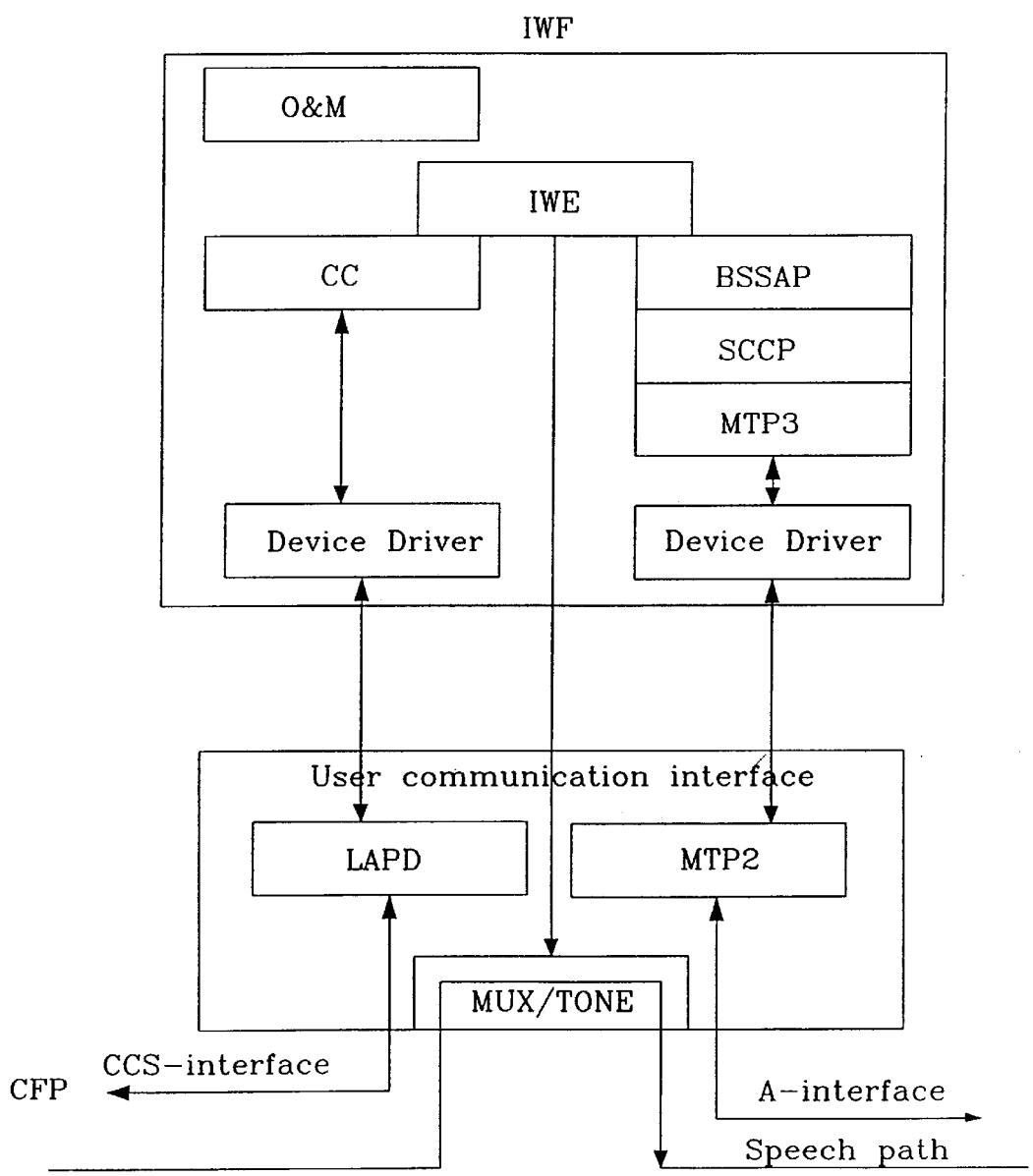

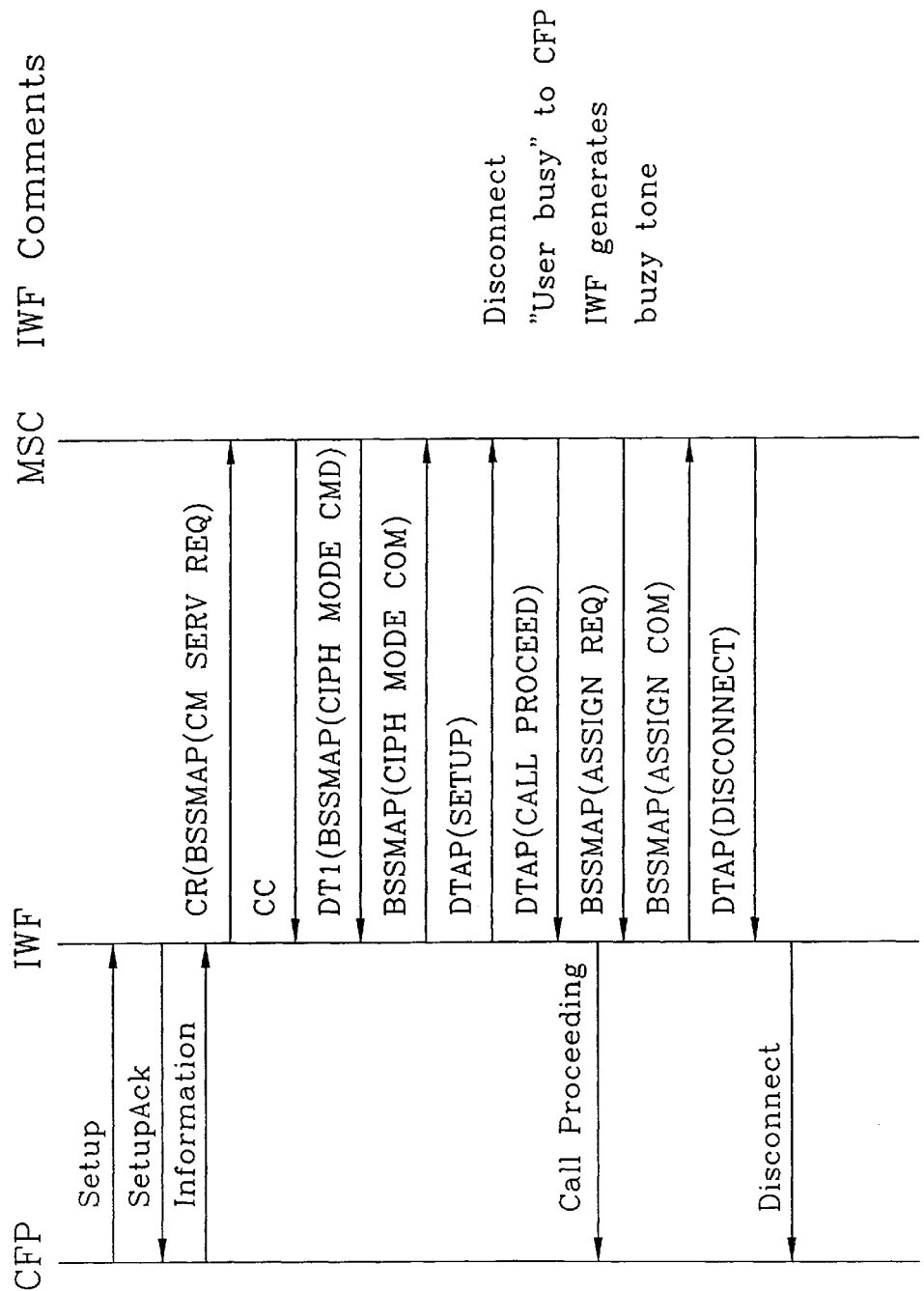

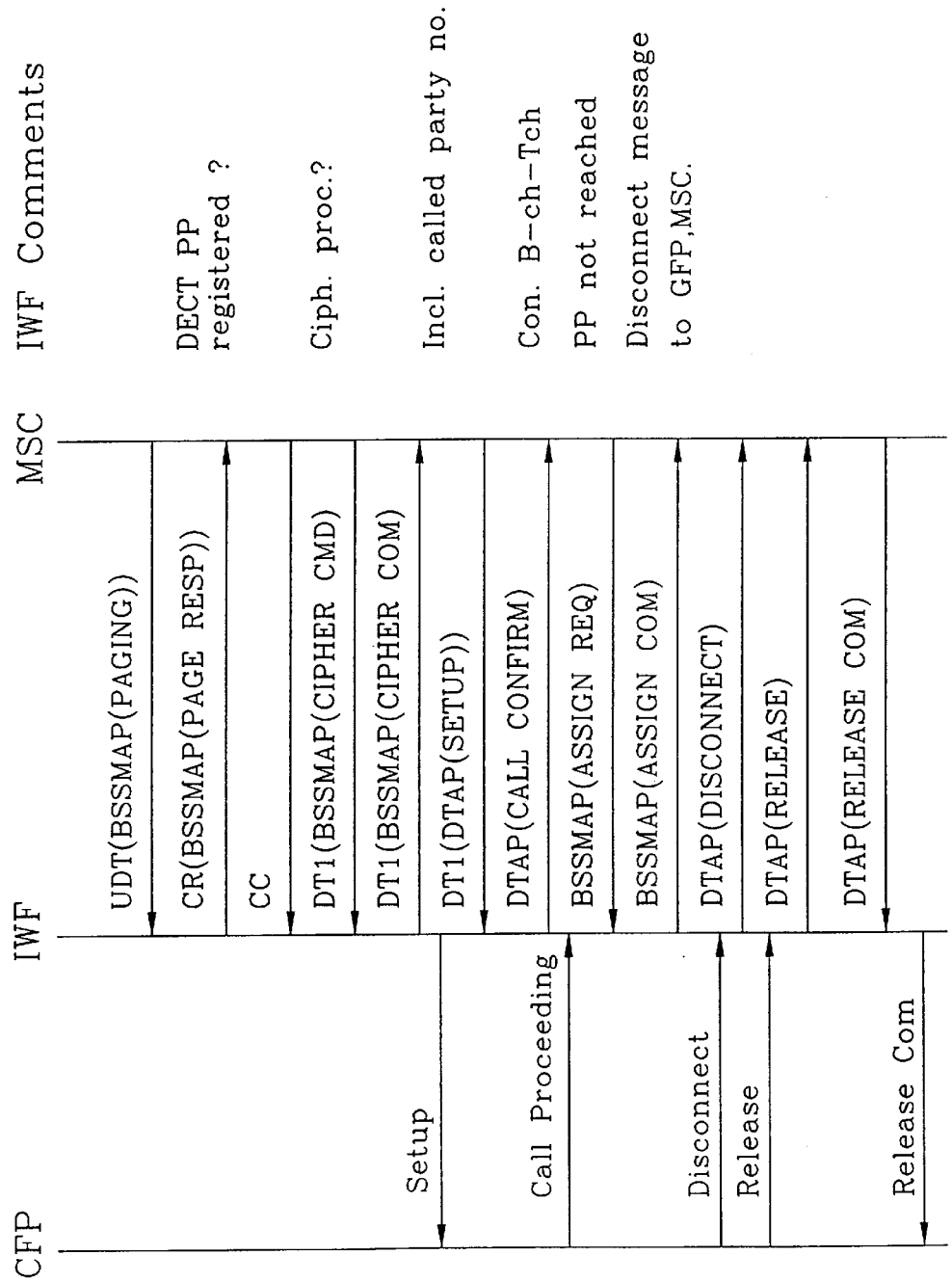

FIG.15a

| Message | Originator |
|---|---|
| Assignment request | MSC |
| Assignment complete | IWF |
| Clear request | IWF |
| Clear command | MSC |
| Clear complete | IWF |
| Reset | Both |
| Reset acknowledge | Both |
| Paging | MSC |
| Complete layer 3 information | IWF |
| Cipher mode command | MSC |
| Cipher mode complete | IWF |
| Reset circuit | Both |
| Reset circuit acknowledge | Both |

FIG.15b

| Message | Originator |
|---|---|
| Paging response | IWF |

FIG.15c

| Message | Originator |
|---|---|
| Location uppdating request | IWF |
| Location updating accept | MSC |
| Location updating reject | MSC |
| CM service request | IWF |
| CM service reject | MSC |

FIG.15d

| Message | Originator |
|---|---|
| Alerting | Both |
| Call confirmed | IWF |
| Call proceeding | MSC |
| Connect | Both |
| Connect acknowledge | Both |
| Progress | MSC |
| Setup | Both |
| Disconnect | Both |
| Release | Both |
| Release complete | Both |

HANDOVER DECT → GSM

HANDOVER DECT → DECT

TELECOMMUNICATIONS SYSTEMS ARRANGEMENT

FIELD OF THE INVENTION

The present invention relates to an arrangement for interconnecting a first communication system and a second communication system such as a cordless access system.

The invention also relates to a communication system comprising a first cellular mobile comminication system and a second cordless access system. Moreover the invention relates to a cordless access communication system which is interworked with a cellular mobile communication system. Still further the invention relates to an arrangement for interconnecting a first and a second system and an interconnected system used to provide for locating and handovers both between a first and a second system and between different sites of the second system.

So called digital cordless communication systems are e.g. used for a limited number of subscribers within a limited area such as within an office building or similar. Particularly such systems are pico-cellular and comprise a number of Base Stations which are connected to a central unit. Through handovers from one pico-cell to another pico-cell the user can roam within the area covered by the network. Such systems can be configured to meet particular requirements of the user in respect of the area to be covered and the number of terminal units, in a particular embodiment, portable telephones, how to be used etc. The systems may particularly be designed to operate in indoor environments with a high traffic density. However, merely a limited number of subscribers can co-exist within the system. An example of such a communication system is the DECT system or the Digital European Cordless Telecommunication system which is a pico-cellular digital cordless access technology standardised by ETSI (European Telecommunications Standardisation Institute). However, a terminal of DECT can not roam between different DECT covered sites and the DECT terminal will only function when the subscriber is within a limited area as defined by the network. Presently a number of attempts are done to connect e.g. the DECT access system to a cellular network and to use the mobility management functionalities of this network and to provide the interconnection with a cellular mobile communication system as e.g. the GSM system.

STATE OF THE ART

Today efforts are done to provide a roaming capability between e.g. different DECT sites through the use of a fixed network. Furthermore, works are done within the ETSI to provide a standardisation of an interworking between GSM and DECT. However, up to date there are no really interworking systems known. In the article "Cordless access to GSM" in Proc. of 5th Nordic Seminar on Digital Mobile Radio Comm. 1992 by S. Salmela et.al., access of the DECT system to the GSM network is discussed and an arrangement is suggested wherein the Fixed Part Controller of the DECT system is connected to a Mobile Switching Center (MSC) over an interface named the R(3) interface which is a modified ISDN subscriber interface using the so called DSS.1+ protocol which is an enhanced ISDN DSS.1 protocol.

Since the DECT access system is directly connected to the MSC, modifications of the interface or the protocol are necessary. This involves complications and impairs an easy interconnection of the systems as well as flexibility is reduced.

SUMMARY OF THE INVENTION

The invention aims at solving the problems of interconnecting a first communication system such as a cellular mobile communication system and a second communication system such as a cordless access communication system in an easy and flexible way.

In a so called cordless access system connections can generally merely be set up within each separate site of this system and moreover a subscriber of such a system cannot access a more global cellular mobile communication system.

Up to now to interconnect a first and a second system of the abovementioned kind at least the interface of the first cellular mobile communication system has to be modified which means that an entirely new interface has to be formed.

It is thus an object of the present invention to provide an arrangement for interconnecting a first cellular mobile communication system and a second cordless access communication system. It is also an object of the invention to provide an interconnected communication system comprising a first cellular mobile communication system and a second cordless access communication system. An object of the present invention is to use the already present functionality of the cellular mobile communication system.

It is also an object of the present invention to provide a cordless access system which is interworked with a cellular mobile communication system.

It is a further object of the invention to provide for locating updating and roaming capabilities between different sites covered by the second cellular cordless access communication system. It is also an object of the invention to provide for locating updating and roaming capabilities between the first mobile cellular communication system and a cordless access system. It is also an object of the invention to provide for so called cordless access communication with the possibility to be reached from different sites and to establish connections to different sites.

Still a further object is to provide an interconnecting arrangement for interconnecting a first system as referred to above and a second cordless system as well as an interconnected communication system enabling handovers to be carried out both between the first and the second system as well as between different sites of the second system.

These as well as other objects are achieved through an arrangement wherein a cordless access system is connected to an interworking function means via an interface of the cordless access system and wherein a mobile switching center of the ceullular mobile communication system via an existing interface thereof is connected to the interworking function.

The objects are moreover achieved through a communication system comprising a first cellular mobile communication system and a second cordless access communication system wherein an interface of the second system is interworked or converted in an interworking function means to an existing interface of the cellular mobile communication system.

A further object of the invention is to provide for the possibility of using one and the same terminal for connections both within one and the same system as well as between the first and the second system as referred to above. This is achieved through the use of a so called dual mode terminal comprising both functionalities.

A number of advantageous embodiments are given by the appended subclaims.

BRIEF DESCRIPTION OF THE DRAWINGS

The invention will in the following be further described in a non-limiting way under reference to the accompanying drawings wherein;

FIG. 11 illustrates the Interworking Function IWF with its GPC-board, FIG. 12a illustrates a table over identity handling from Control Fixed Part CFP to Interworking Function IWF, FIG. 12b illustrates an identity handling table as in FIG. 12a but in the direction from the MSC to the IWF, FIG. 13b illustrates a call establishment originating from CFP as in FIG. 13a but wherein the called party is busy, FIG. 14a illustrates a CFP terminated call establishment wherein the called party answers and FIG. 14b illustrates a CFP terminated call establishment as in FIG. 14a but wherein the called party is not reachable, FIGS. 15a–15d illustrate tables of messages for the Base Station Mobile Application Part BSSMAP and for the Direct Transfer Application Part DTAP respecively, FIG. 16a schematically illustrates a signalling folowchart for a handover between DECT and GSM and FIG. 16b schematically illustrates a signalling flowchart for a handover from one DECT site to another DECT site.

DETAILED DESCRIPTION OF THE INVENTION

In the following an advantageous embodiment will be described wherein the first communication system is the GSM system and the second system is the Digital European Cordless Telecommunication system DECT which is a pico-cellular digital cordless access communication system. The invention of course can also be applied in relation to other communication systems and it is not limited to telephone communication systems. For example it can be applied to the Integrated Services Digital Network ISDN etc. forming the first system and any other digital cordless communication system than DECT can be used applying the same principles. The communication system does not even have to be digital systems, the invention is likewise applicable to analogue systems, such as e.g. NMT, AMPS, TACS and similar particularly since it does not use the air interface. The systems are in an advantageous embodiment using Time Division Multiple Access, but also this is not indipensible. The invention thus also relates to systems based on Frequency Division Multiple Access, FDMA and also CDMA.

Figure 1:
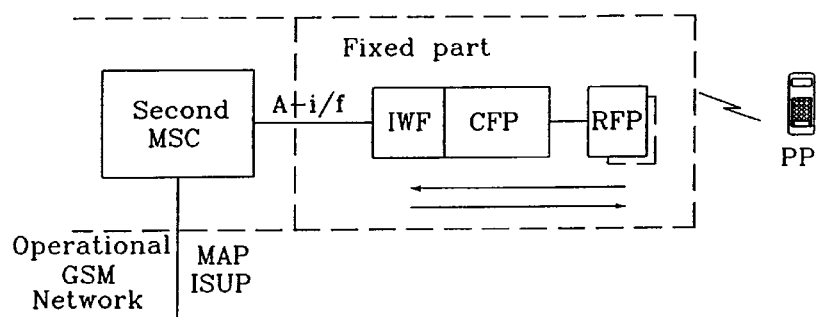
FIG. 1 schematically illustrates the interconnection of the DECT and the GSM systems, FIG. 2 schematically illustrates the capability of roaming between two DECT sites via the GSM network, FIG. 3 schematically illustrates the use of a dual mode terminal.

FIG. 1 illustrates a configuration wherein the fixed part comprising the interworking function IWF, the controlled fixed part CFP and a radio fixed part RFP which via the A-interface is connected to a second Mobile Switching Centre MSC which is a cellular switching node and also has the functions of a normel MSC. The interworking function IWF interconnects this second Mobile Switching Centre MSC and the DECT access system via the A-interface of the GSM system without modifications of the A-interface. The second Mobile Switching Centre MSC is connected to the operational GSM network, or a first Mobile Switching Centre MSC thereof via a Mobile Application Part MAP or the Integrated Services Digital Network User Part ISUP. Therethrough call connections between a DECT terminal PP and a GSM terminal MS are enabled.

Figure 2:
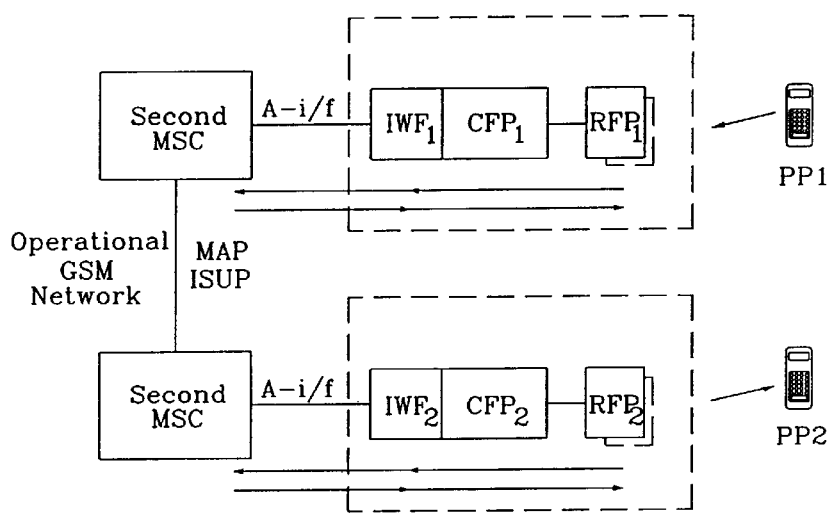

FIG. 2 illustrates how roaming capabilities are provided between two DECT terminals PP1 and PP2 in different sites. through the use of the mobility management functionality of the GSM network according to the invention.

A first and a second fixed part RFP1, RFP2 relate to the two different sites of each pico-cellular cordless telecommunication system. For simplifying reasons the second Mobile Switching Centres are not illustrated in this figure.

Figure 3:
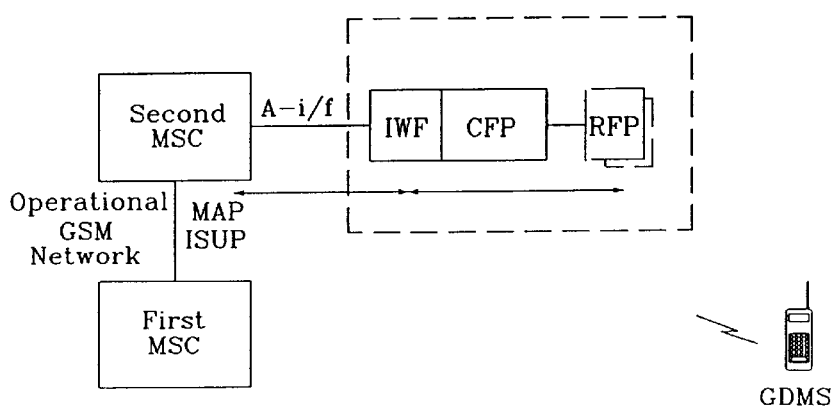

In FIG. 3 a dual mode terminal or a GDMS (GSM-DECT Mobile Station) terminal is illustrated which particularly uses the same subscribing number regardless of whether the terminal is in GSM mode or in DECT mode. In this case the second cellular switching node is used to handle particular GSM specific functions such as authentication and encryption etc. With the dual mode subscription a subscriber will always be reached independently of being within DECT coverage or not.

Figure 4:
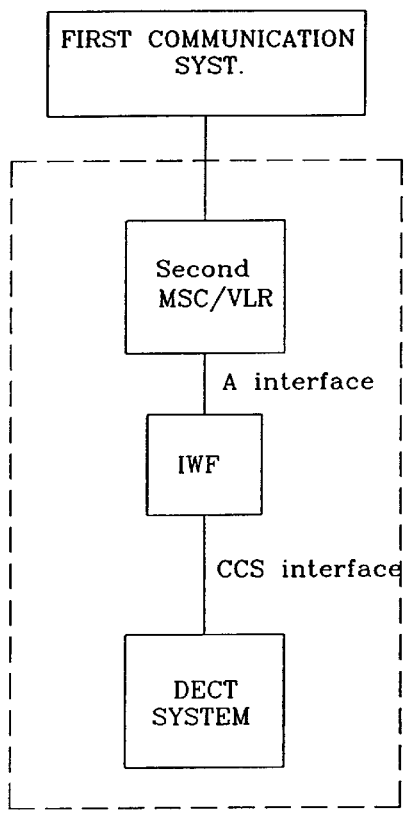
FIG. 4 illustrates a simplified interconnection of a first and a second communication system.

FIG. 4 illustrates an interconnected arrangement with a first mobile communication network and a DECT access system. The interconnection is obtained via a second Mobile Switching Centre/Visitor Location Register MSC/VLR and the interworking function IWF. The interworking function IWF is used to interconnect the second Mobile Switching Centre/Visitor Location Register MSC/VLR and the DECT access system via the GSM A-interface through converting the protocol of the second interface to the protocol of the first interface. This is in turn connected to the operational GSM network. The second Mobile Switching Centre/Visitor Location Register MSC/VLR can be a standard device and generally no particular modification is necessary.

Through the interworking function IWF communication is provided between the second Mobile Switching Centre/Visitor Location Register MSC/VLR and the DECT access system over the GSM A-interface. The interworking function comprises in particular a Computer Platform and a user Communication Interface or e.g. a UPSim general purpose board GPCB. The software of the interworking function IWF comprises a number of modules. This will be further described below. This however merely constitutes one embodiment of an Interworking Function which of course can be modified in a number of ways, the essential being that it provides for converting of protocols to enable the existing interface of the first system to be used.

In a particular embodiment the DECT access system may particularly be the so called DCT 1800 system. The Common Channel Signalling interface may particularly be ported on to e.g. a 1,5 or 2Mbit PCM link for the connection of the DECT access system to e.g. a 1,5 or 2Mbit PCM interface of the interworking function IWF. Of course a number of other values can also be used. The Common Channel Signalling interface CCS will be further described below.

Figure 5:
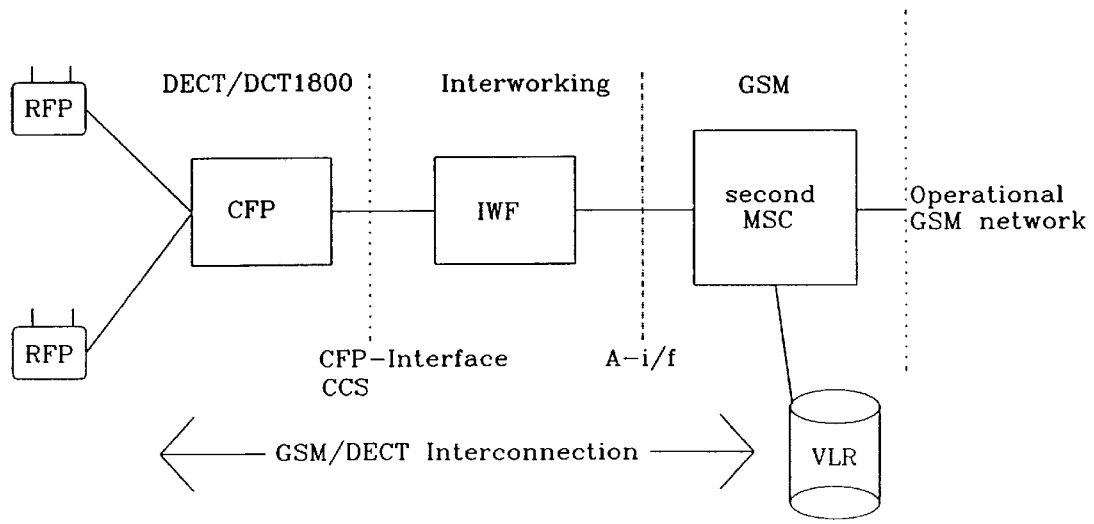
FIG. 5 illustrates a general configuration of the interworking function as connected via the interfaces, FIG. 6 schematically illustrates the interworking function IWF.

FIG. 5 illustrates the interconnection of the DECT access system with a GSM network. The interworking function IWF interworks signalling protocols between the A-interface which is connected to a second Mobile Switching Centre MSC as already discussed above and a proprietary Common Channel Signalling interface CCS which is connected to a Control Fixed Part CFP or radio exchange REX of the DECT access system or the second system to which radio fixed parts RFP are connected. The functions supported by the Interworking Function IWF are given by the interworked protocols. VLR in the figure illustrates a Visitor Location Register.

Figure 6:
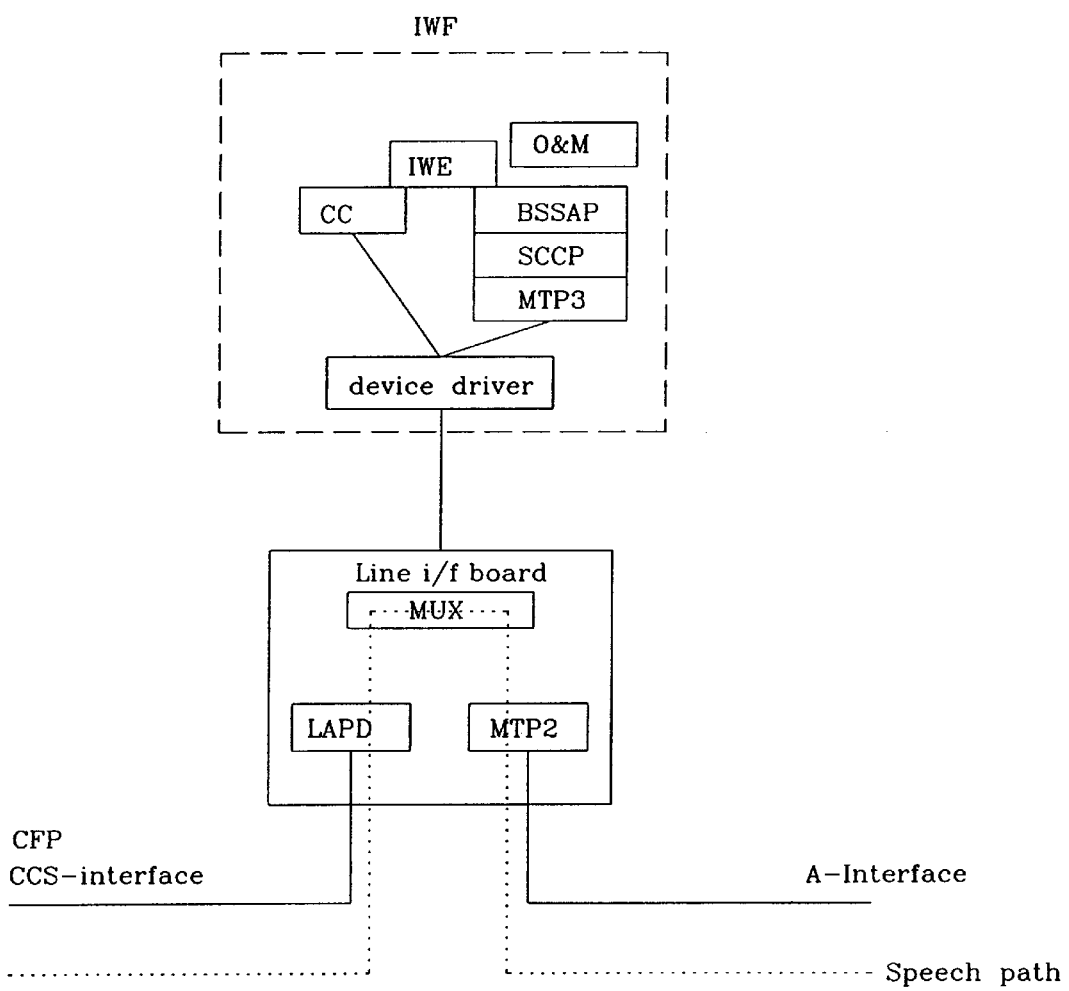

FIG. 6 illustrates the interworking function IWF which as already stated in the described embodiment comprises a PC or a Computer-platform and a Communication Interface or a line interface board. The Interworking Function IWF comprises a number of different modules e.g. the interworking entity IWE which handles the mapping of layer 3 messages between the CCS interface and the A-interface. Advantageously a Call Control function is implemented in the interworking entity IWE. The interworking entity IWE will be further described later on under reference to FIG. 10.

The Base Station System Application Part BSSAP is a further module which handles channel allocation and message transfer over the A-interface. The Base Station System Application Part BSSAP which is used in the interworking function IWF is a subset of a complete BSSAP which will be discussed later on under reference to FIG. 7.

The Operation and Maintenance O&M module is particularly adapted for the interworking function IWF and will also be further described below. The Call Control module interfaces towards the interworking entity and a device driver. The Call Control module will be further described under reference to FIG. 8. The further modules of the interworking function IWF are the Signalling Connection Controlled Part SCCP which comply with the CCITT blue book rec. Q.711–Q.714 in general and the message transfer part level 3 as complying with the CCITT blue book rec. Q.701–Q.705. The line interface board comprises a multiplexer and a Link Access Procedure on the D channel, LAPD and a Message Transfer Part level 2 MTP-L2.

As already mentioned above the A-interface provides the interconnection with the GSM-network via the second MSC/VLR whereas a common channel signalling interface CCS provides the connection with the DECT system. A number of procedures-/messages will be supported on those interfaces together with supported information elements within the messages.

First the CCS-interface will be briefly described. The CCS-interface is a subset of Q.931 with additional functionalities to support mobility management and operation and maintenance functions. The interworking function IWF will support basic call control to almost full extent. Necessary mobility management functions will be supported in order to handle registration and deregistration of DECT terminals PP. Also Operation and Maintanance functions will be supported in this particular embodiment.

In the following will be summarised which procedures, messages and information elements that are supported. A number of messages are sent either by the interworking function IWF or by the Control Fixed Part CFP (radio exchange REX) or both. A number of Common Channel Signalling CCS messages are sent for circuit mode connection control. An example is the procedure locating updating which sends a message which may be sent either by IWF or CFP to indicate that call user locating has been initiated.

Figure 16A:
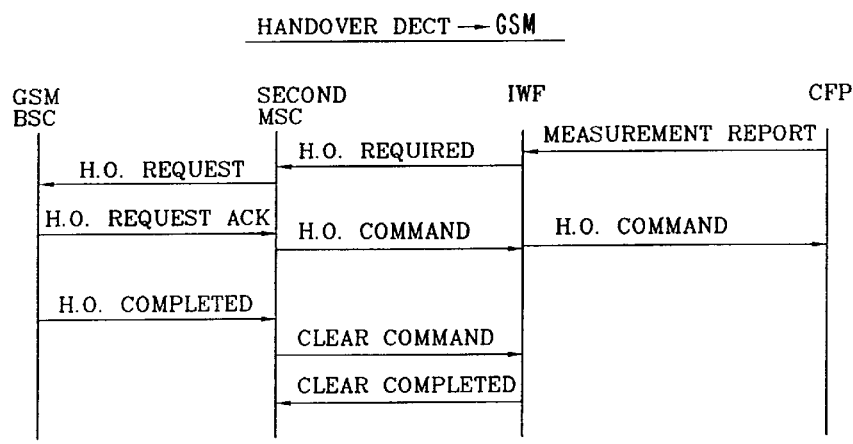
Figure 16B:
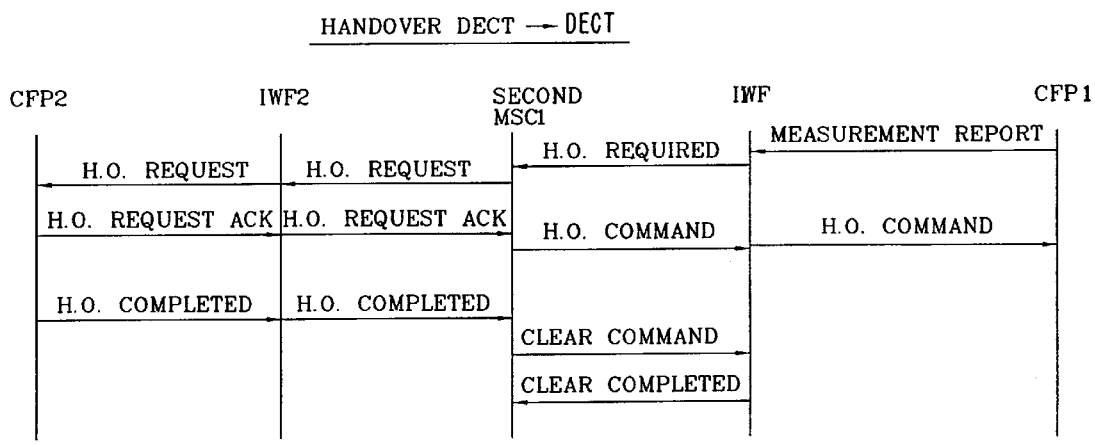

Further procedures comprise roaming and handover. The latter case is illustrated in FIGS. 16a and 16b, wherein FIG. 16a a relates to a handover from DECT to GSM and FIG. 16b relates to a handover between two DECT sites with one common second MSC although another case is also possible, i.e. between two second MSC (s) (not illustrated). A further message, call proceeding, may also be sent by the IWF or the CFP. This message serves a purpose to indicate that the requested call establishment has been initiated and no more call establishment information is expected. Further messages such as a message to indicate call acceptance by the called user, here called connect, and another message indicating that the user has been awarded the call, here called connect ackowledge, can be sent either by the IWF or the CFP. By the CFP message can be sent a request to the IWF to clear the connection or it may be sent by IWF to indicate that the connection is cleared. (Disconnect message). The IWF is provided with the called party number by a message sent by the CFP. Messages indicating that a channel has been disconnected and that the channel and call reference will be released and to indicate that the used channel and call reference are released may be sent by IWF or the CFP respectively. Message for the initiation of a call establishment is likewise sent either by the IWF or the CFP. Furthermore a number of CCS messages for a non circuit mode connection control are sent either by the IWF or the CFP.

In the particular embodiment the A-interface that is supported by the IWF is a subset of a standardized GSM A-interface. In the following will briefly be discussed which procedures, messages and information elements that are supported by the interworking function IWF. For the provision of the communication between the Mobile Switching Centre and the Interworking Function IWF a number of messages are available. These can particularly be divided into two main categories, namely the BSSMAP, the Base Station System Mobile Application Part messages and the DTAP, or the Direct Transfer Application Part messages. The latter messages may furthermore be divided into three different categories, namely the Radio Resource Management messages, the Mobility Management messages and the Call Control messages. FIGS. 15a to 15d illustrate lists of a—messages for BSSMAP, b—messages for Direct Transfer Application Part, DTAP/ Radio Resource Management, RR, c—messages for DTAP/Mobility Management, MM, d—messages for DTAP/Call Control, CC.

In the tables is also illustrated from where the messages originate i.e. from where they are sent. The tables will in the following be briefly gone through. The assignment request is sent from the MSC to the IWF to request the IWF to assign a terrestrial circuit or a traffic channel. The IWF does not take account of the channel type information element since this merely applies for the GSM A-interface. Preferably a Signalling Connection Control Port SCCP connection oriented mode is used. The assignment complete message indicates that the requested assignment has been completed in a correct way. With the clear request message it is indicated to the MSC that the IWF whishes to release the connection whereas with the clear command message the IWF is instructed to release the connection. With the clear complete message the MSC is informed that the connection has been successfully cleared and messages relating to reset respectively indicate to the receiving unit that the transmitting unit has suffered a failure etc. and that services can be resumed respectively. The paging messages contain the identity information to enable the paging of a DECT portable part PP. The message Complete Layer 3 information, is sent from IWF to the MSC up on reception of an initial layer 3 message on the Common Channel Signalling interface. The IWF may either include a paging respond locating update request or a CM (Connection Management) request. Here complete layer 3 information may be a mobility Management Message or a Radio Resource messages as listed in FIGS. 15b, 15c. The following messages of the BSSMAP relate to messages which as such are known per se and generally obvious to apply.

In response to a paging message, the IWF sends a paging response message which is a message for radio resource (RR) management. When a DECT station or PP is present in a particular location area, the IWF sends a locating updating request to the Mobile Switching Centre MSC in order to register the portable part. To indicate that an updating has taken place and been completed in the network, the Mobile Switching Centre MSC sends a locating updating accept to the interworking function. If the updating has failed, the Mobile Switching Centre instead sends a locating updating reject to the interworking function. To request the establishment of a circuit switched connection, the interworking function sends a CM service request to the Mobile switching centre and if the Mobile switching centre sends a CM service reject to the interworking function, it is indicated that the requested circuits with its connection establishment could not be provided. When call user alerting has been initiated, the Mobile switching centre sends an alerting message to the interworking function or the other way round. The interworking function sends a call confirmed message to the MSC in order to confirm an incoming call request. The message call proceeding gives the information that the requested call establishment information has been received and that no more call establishment information will be accepted. The message connect indicates call acceptance by the called user. Part of these as well as further messages are known per se and the meaning should be understood, the main issue being their preceding, from where and to where they are sent which also is indicated in the tables of FIGS. 15a–15d.

Generally (in this particular embodiment) the Mobile Switching Centre do not include called party number in the set up message. The Interworking Function IWF determines the called party number based on the IMSI-code (International Mobile Subscriber Identity) in a paging message.

In the following the respective modules of the Interworking Function IWF will be briefly described.

Figure 7:
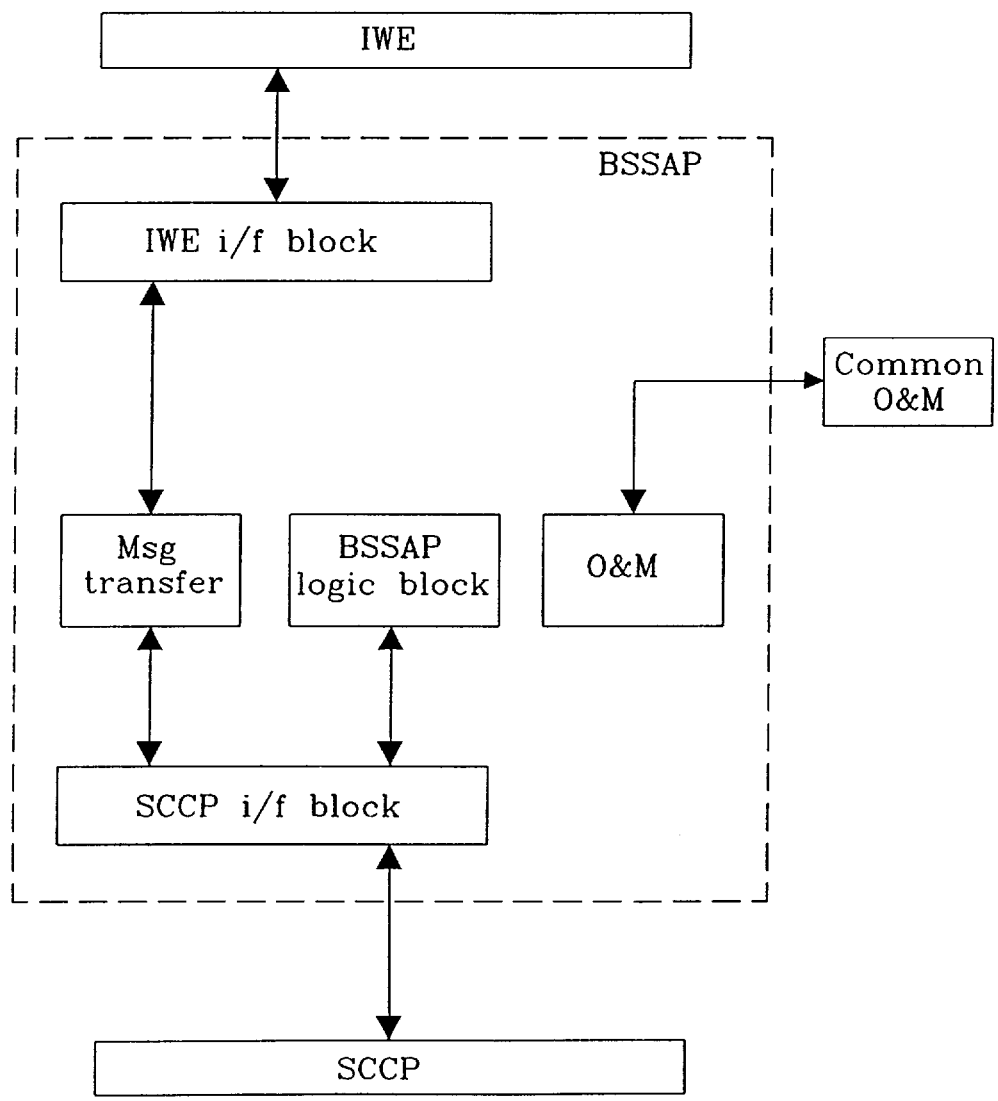
FIG. 7 illustrates the Base Station System Application Part BSSAP module.

In FIG. 7 the Base Station System Application part BSSAP is illustrated. The BSSAP handles channel allocation and message transfer over the A-interface. FIG. 7 illustrates the functional blocks of the BSSAP and the interfaces between the blocks and towards other functional modules. As can be seen from the figure, the BSSAP has interfaces towards the interworking entity, IWE, the Signalling Connection Control Part SCCP, and the common Operation and Maintenance module. The SCCP interface block handles connection with the SCCP which is used to provide the possibility to carry information between the interworking function and the Mobile Switching Centre. The interworking entity IWE interface block handles the communication between the BSSAP and the interworking entity IWE. The message transfer block is used to transfer Call Control and Mobility Management messages to and from the interworking entity IWE and the logic block of the BSSAP supports all procedures between the Mobile Switching Centre and the interworking function that require interpretation and processing of information related to single calls and resource management. Finally the Operation and Maintenance block O&M, deals with all Operation and Maintenance functions that are required from the common Operation and Maintenance module as illustrated in the figure.

As already referred to above, the SCCP interface block handles the communication with the SCCP module or the Signalling Connection Control Part of CCITT signalling system No. 7 which provides the possibility to carry information between the interworking function and the Mobile Switching Centre. The manner for doing this is known per se. As already referred to above, the message transfer block has as an object to translate incoming messages from the Mobile Switching Centre into DTAP and BSSMAP primitives and primitives from the interworking entity into outgoing messages for the Mobile Switching Centre. This may be done by discarding those information elements in an incoming message which are not used by the interworking entity and adding information elements which are not provided by the interworking entity to outgoing messages. The BSSAP keeps track of which connection a message belongs to in an advantageous embodiment, by means of two parameters, namely the IMSI-code and the connection identity. The IMSI-code is used in a connection-less mode whereas as soon as connection oriented service within the SCCP is established, a connection identity is used instead. The messages are translated in a manner known per se. The logic block of the BSSAP takes care of the BSSMAP messages and acts upon them either through translating and forwarding them to and from the interworking entity IWE or by responding to the Mobile Switching Centre in a corresponding way. Finally, with the Operation and Maintenance block it is possible for the operator to monitor and control the BSSAP. This can also be done in any other appropriate manner which as such may be known.

Figure 8:
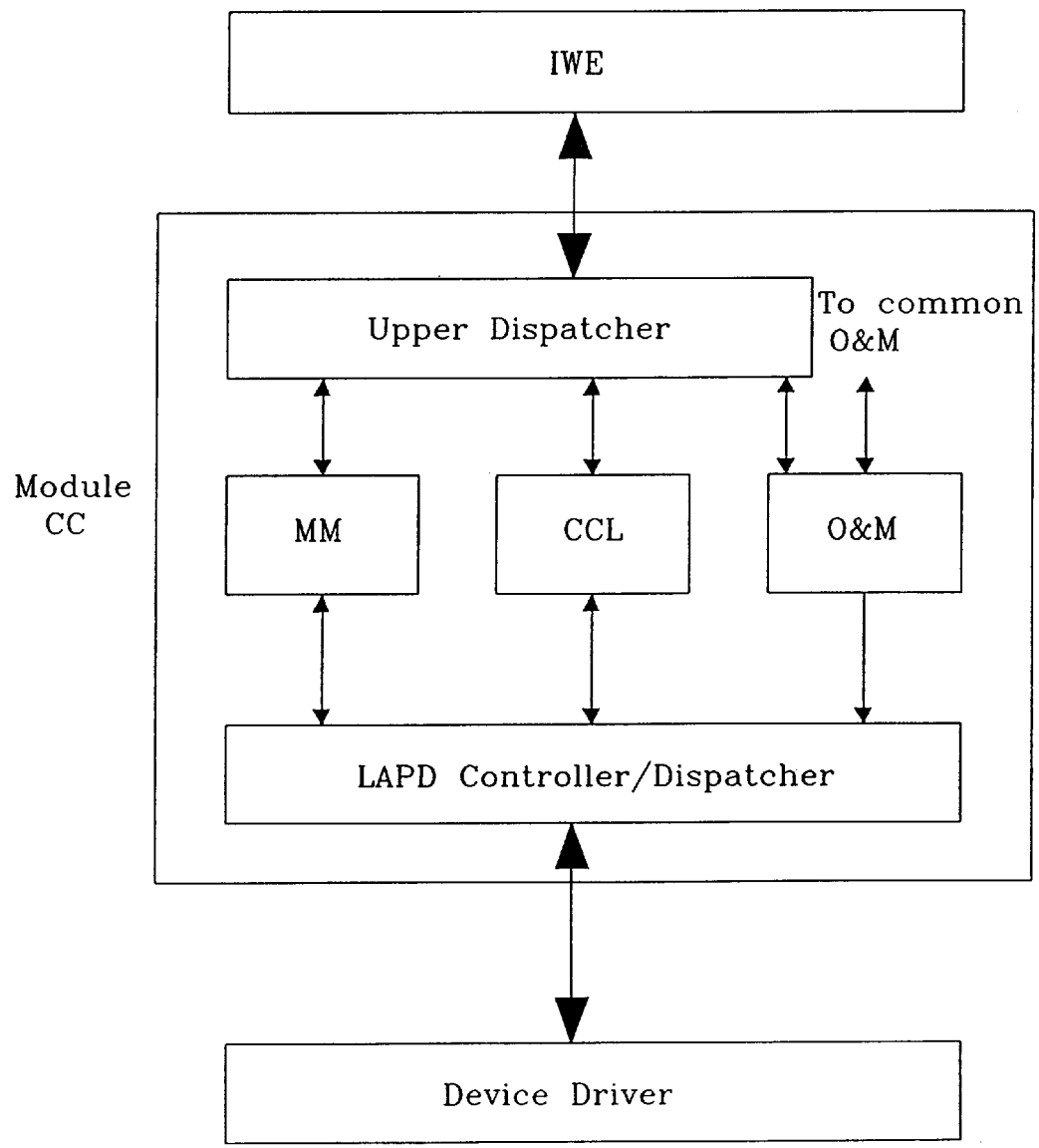
FIG. 8 illustrates the call control CC module, FIG. 9 schematically illustrates the module Operation and Maintenance, O&M.

In FIG. 8 the call control module is illustrated. This module has interfaces towards to the interworking entity IWE and the device driver. The call control CC module is based on common channel signalling interface which is a proprietary subset of Q.931. Preferably the Call Control module of the Interworking Function merely supports a limited set of functions which only are specified for the Call Control interface. The block referred to as device driver transfers the Link Access Procedure on D channel primitives between the LAPD protocol and the LAPD controller/dispatcher which is a block of the call control module. This generally follows the CCITT recommendations Q.920–Q.921 (blue book). The LAPD controller/dispatcher furthermore sends the data (Q.931messages) to the mobility management MM block, to the Call Control logic block and the Operation and Maintenance O&M and vice versa. This is also further evaluated in the CCITT recommendation Q.931, blue book. With the Mobility Management block mobility of users terminals is supported. The Call Control logic block handles the call establishment primitives, call clearing primitives and several further primitives. The Operation and Maintenance block in this case, handles the configuration/start of the LAPD protocol, CCL and error handling. In further aspects this block works in a manner which is generally known per se and it provides communication with the common Operation and Maintenance block. Finally the block Upper Dispatcher is occupied with the primitives from the Interworking Entity IWE module or the Mobility Management block, the Operation and Maintenance block or the Call Control logic bloc. This block dispatches the primitives to the concerned, i.e. the appropriate block.

Figure 9:
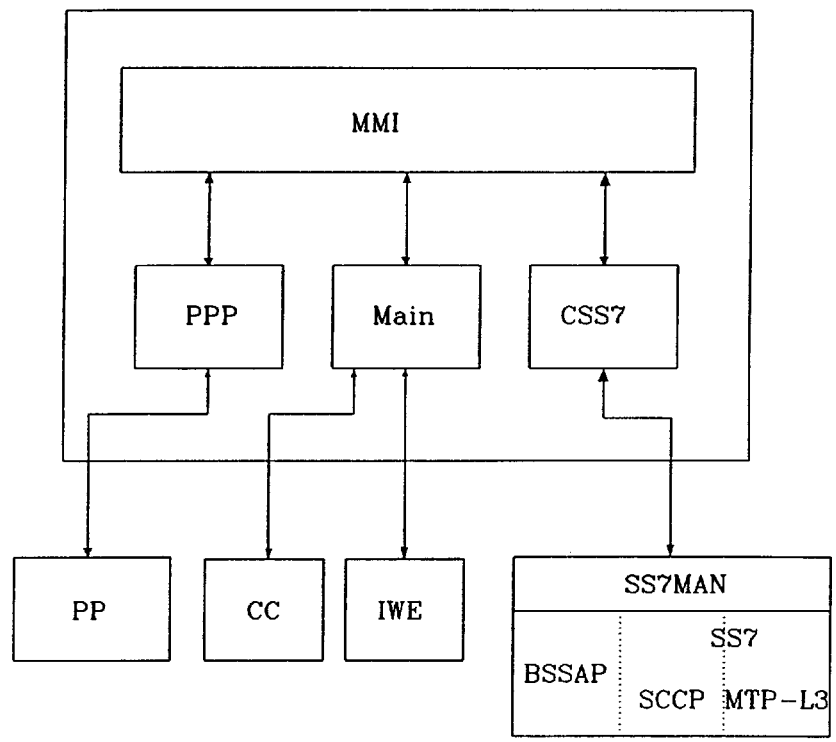

The Operation and Maintenance block and its interfacing blocks are illustrated in FIG. 9. As can been seen from the figure, the Operation and Maintenance module interfaces towards the Portable Part, the Interworking Entity IWE, the Call Control and towards the Signalling System No. 7 manager (SS7Man) under which are the BSSAP, the SCCP and the message transfer part—level 3 module. The blocks of the Operation and Maintenance module are the Man Machine Interface MMI, Programme Portable Part PPP, Control CSS7 and the Main block. The MMI handles the interaction with the operator and through this the operator can control the IWF. From there a number of functions can be performed such as configuration of the portable part PP in the DECT system with e.g. portable user number, authenticity key etc., loading of configuration parameters for the IWE module and for the CC module, start and stop of the interworking function and e.g. location updating etc. The Program Portable Port PPP takes care of the programming of the DECT Portable Part PP, the main block takes care of the primitives between the Operation and Maintenance module and the CC module and between the Operation and Maintenance module and the IWE or the interworking entity module. This thus forms the interface with both the Call Control module and the interworking entity module. The CSS7 block controls the SS7-stack and the BSSAP module through the SS7-stack manager, SS7Man. The primitives will go to SS7Man which analyses them and sends them back to the appropriate modules.

Figure 10:
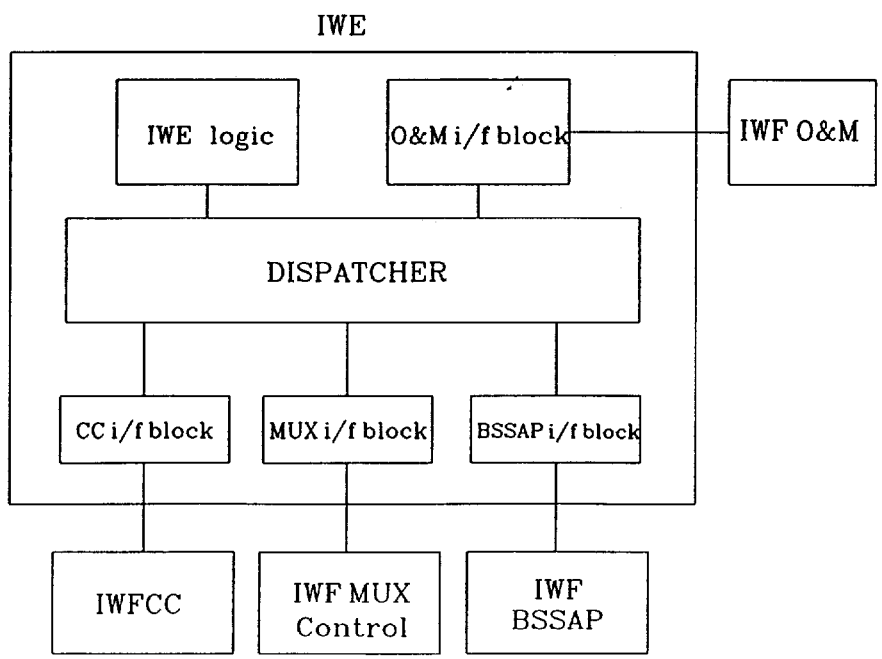
FIG. 10 illustrates the Interworking Entity IWE-module, FIG. 10a schematically illustrates an outgoing call from DECT to GSM, FIG. 10b schematically illustrates an incoming call from GSM to DECT.

In FIG. 10 the interworking entity IWE block is illustrated. This block handles the interworking of network layer messages between the Common Channel Signalling CCS interface and the A-interface. The interworking of the functional signalling applies translation of Q.931 messages to GSM (GSM 04.08) call control CC messages and vice versa.

The interworking entity IWE further handles the mobility management MM signalling and all identities which are needed for routing to or from DECT-terminals PP within the system. As can be seen e.g. from FIG. 6 the interworking entity module has four different interfaces towards other modules. The Operation and Maintenance module has already been discussed and handles the Operation and Maintenance of the entire interworking function and contains the Man Machine Interface MMI towards the operator as well. The second module towards which the IWE has an interface is the BSSAP module which handles message transfer of the A-interface. A third module is the CC module which handles the message transfer of the CCS interface. Finally the MUX handling comprises tone/busytone generation and switching of time slots TS. The initiation of tone generating will be handled by the interworking entity IWE and transferred over the MUX interface. The dispatcher block handles the transferring of primitives between the blocks in the module and depending on state and event (the received primitive) what to do next. Towards the Mobile switching centre MSC, the module behaves like a GSM Mobile station MS. The dispatcher handles the sessions by connecting the B-channel of the call control interface to a connection Identity of the BSSAP interface. The IMSI determines the MSISDN number of the user in the DECT system. The IWE logic block handles the translation of. the network layer (layer 3 message data). Moreover the data may need to be translated from one storage type to another. The main function of the IWE is to translate the calling part number from the DECT system into its IMSI (International Mobile Subscriber Identity). The IMSI values are loaded at initiation of the interworking function. In order to handle the interworking between the DECT and the GSM system, the interworking entity has to handle three different identities, namely the calling parting number, the called party number and the IMSI code. The translation of the identities in the case of an outgoing call from the DECT system into the GSM system is schematically illustrated in FIG. 10a. FIG. 10b illustrates in the same way an incoming call from the GSM system to the DECT system. Advantageously the IWE logic has to check that the subscriber does not call the own MSISDN-GSM (MSISDN-G) number. If this is the case, a busy tone may be generated in an advantageous embodiment.

The block Call Control interface handles the signalling to and from the IWF Call Control and the IWE dispatcher. The call control interface is an interface both to call control CC, handling the circuit switched calls and to the mobility management MM handling registration and authentication of the Mobile part.

The BSSAP interface block handles the signalling to and from the BSSAP and the IWE dispatcher.

The MUX interface block handles the signalling to the MUX. This among others comprises connecting and disconnecting time slots TS on the MUX and the generation of tone/busytone to the sessions, i.e. MUX interface block among others initiates or terminates the switching of time slots.

The Operation and Maintenance interface module handles the signalling to and from the Interworking Function IWF Operation and Maintenance module to the IWE dispatcher. The Operation and Maintenance interface module is used for configuration, start of the IWF module and error reporting. The Operation and Maintenance module furthermore supports the possibility of making location updating. At a configuration request the following parameters are loaded into the interworking entity; the using number of the DECT portable part PP, PUN, the authentication key of the DECT user, a parameter which merely is used by the Call Control module and finally the IMSI-code of the DECT user.

The Operation and Maintenance module interface also handles other functions which however are of a general character and therefor will not be discussed or referred to herein.

As referred to previously, the interworking function comprise a user Communication Interface or a GPC-board. This is further illustrated in FIG. 11. In an advantageous embodiment this GPC-board comprises functionalities which are needed for the control of the MUX and for generation of different tone patterns apart from other functions.

The Link Access Protocol LAP protocol is used for communication with the DECT network and the CCITT number 7 signalling protocol is used for communication with the GSM network via the A-interface. In an advantageous embodiment the GPC-board comprises a functionality for dynamically controlling the MUX.

The interworking function IWF communicates via the two protocols, LAPD and the signalling system number 7 as well as the MUX and TONE modules on the GPCB via the device driver. The device driver handles all signalling between the GPCB and the interworking function IWF (also included the MUX and TONE messages). The block called LAPD is an actual OSI layer 2 implementation of the LAPD protocol and as can be seen from the figure this block resides on the GPC-board (GPCB). The GPCB may be a standard board but advantageously comprising further functionality. This can however be adapted to particular requirements and needs which need not be defined herein.

In FIGS. 12a and 12b the identity handling according to an advantageous embodiment of the invention is illustrated.

A subscriber of the interconnected system will have four different identities, namely an "open" MSISDN for GSM access which in this case is called MSISDN-G, an IMSI which is related to the open MSISDN., here referred to as the IMSI-G, a "hidden" MSISDN for DECT access, MSISDN-D and finally an IMSI which is related to the hidden MSISDN, the IMSI-D. The MSISDN-G is used for incoming calls. If the subscriber is not reachable or does not answer, call forwarding to the MSISDN-D is done. Paging of the A-interface is done with the IMSI-D. All DECT portable parts PP are configured with MSISDN-G.

Thus the IWF must map the IMSI-D to the MSISDN-G before paging in the DECT system can be carried out. Furthermore the interworking function IWF must be capable of identifying calls from a DECT portable part PP which uses its own MSISDN-G as called party number. In this case the interworking function must generate a busytone. The mapping of identities in the direction from the radio exchange REX to the interworking function IWF is illustrated in FIG. 12a.

In FIG. 12b the mapping of identities in direction from the Mobile Switching Centre MSC to the interworking function IWF is illustrated. The codings given the figures (FIGS. 12a and 12b respectively) are merely given as examples. Any other way of coding can be applied.

In an alternate embodiment MSISDN-G is hidden instead of MSISDN-D.

In still another embodiment none of them is hidden.

Figure 13A:
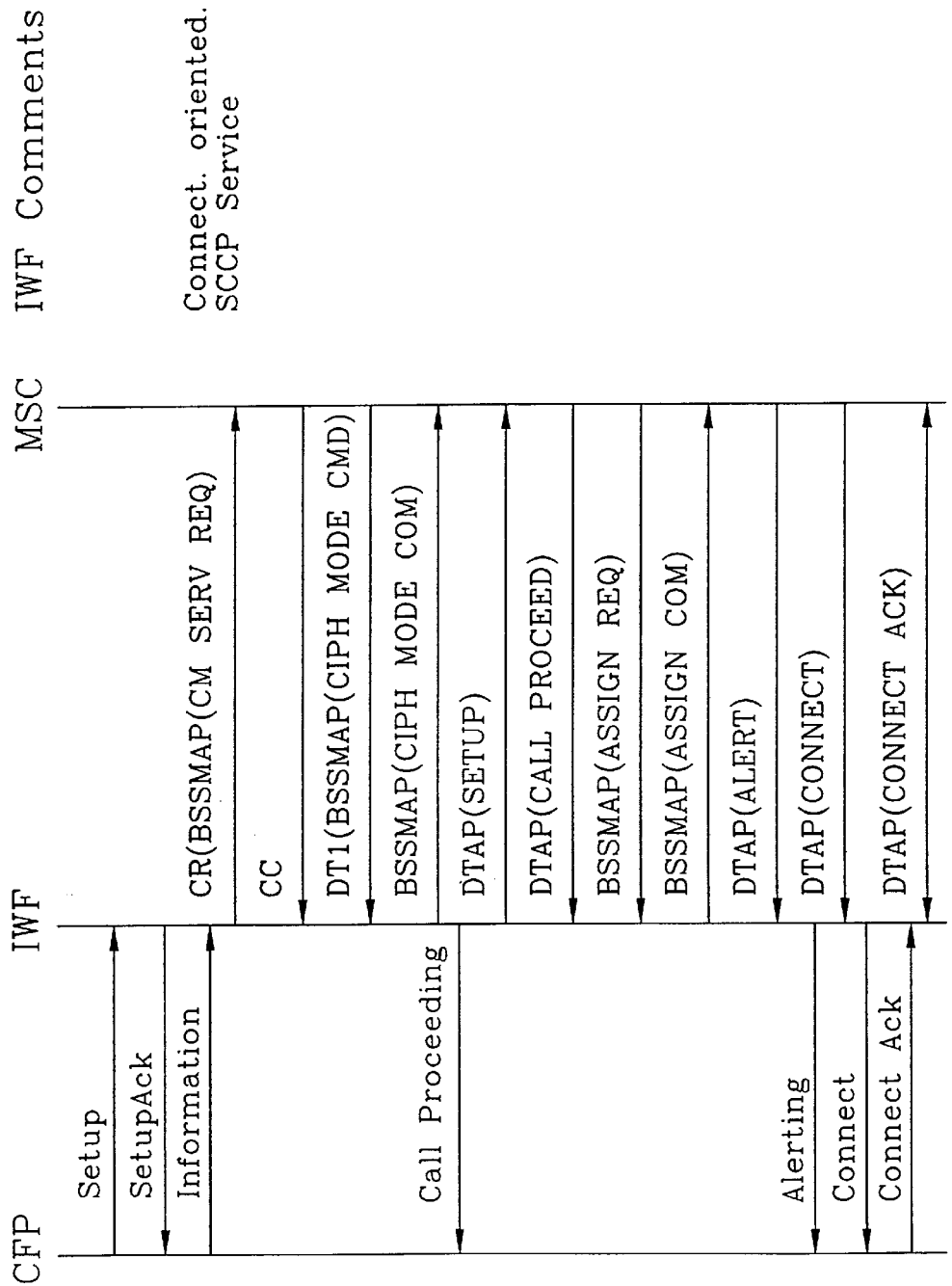
FIG. 13a illustrates a call establishment originating from CFP wherein the called party answers.
Figure 14A:
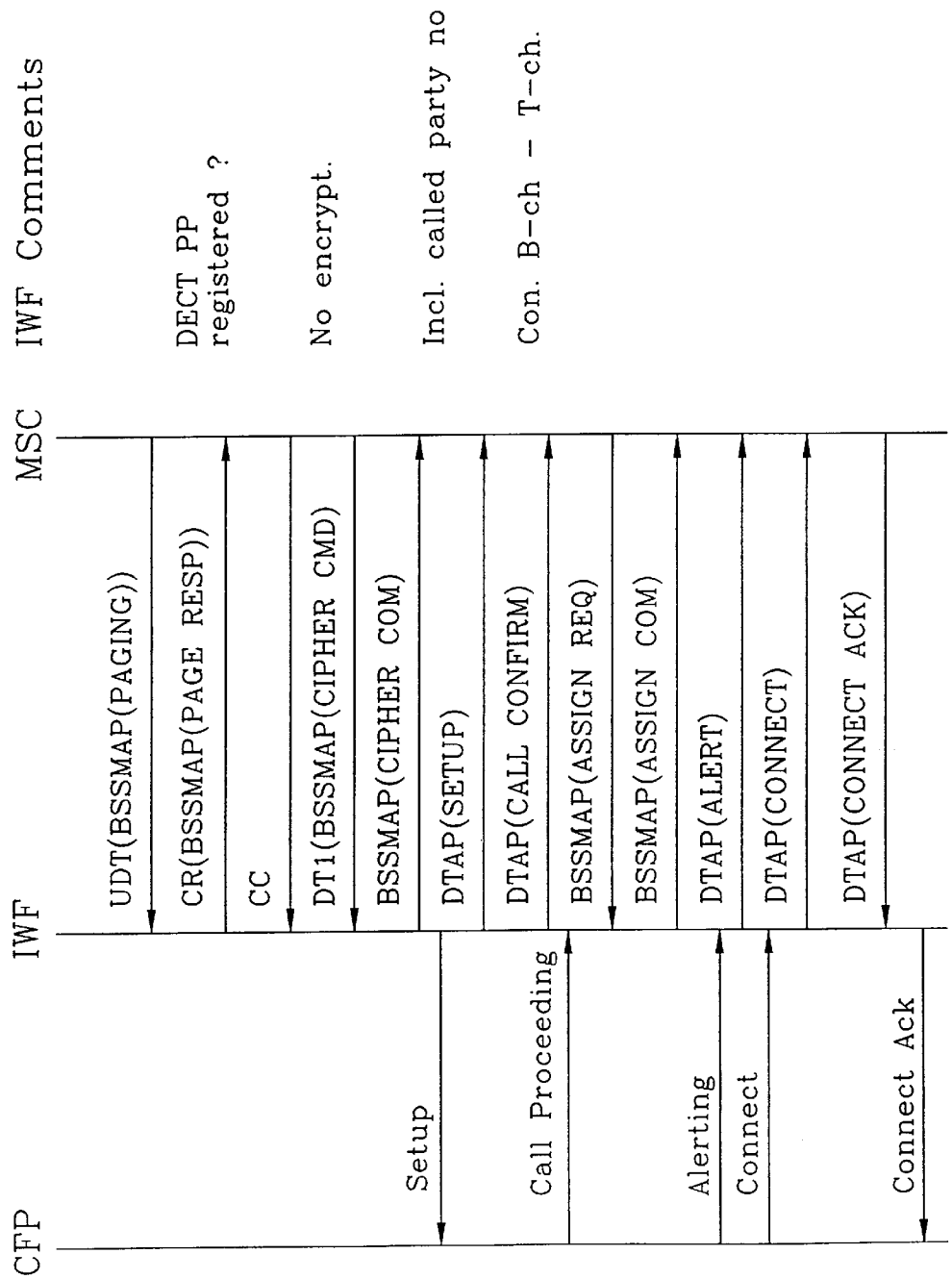

In FIGS. 13a,b and FIGS. 14a,b four illustrative signalling cases are shown with sequence diagrams. The diagrams represent signalling on a functional level which for the CCS interface means the network layer. On the CCS interface all messages are carried within LAPD I-frames which indicates that there is no change of mode on the data link. At the A-interface the message category is indicated (DTAP or BSSMAP). Also changes of SCCP mode are indicated. The interworking function IWF coordinates timers between the interfaces which however will not be further described here.

First FIG. 13a illustrates a cordless establishment which originates from a radio exchange or a CFP in a particular normal case when the called party answers. A normal call establishment which is initiated from the portable part PP starts with the setup message with the calling part number. The IWF then returns a setup acknowledge message with the B-channel which will be used as a traffic channel. The complete called party number is sent in the information message and after receiving information, the IWF continues to initiate the call setup on the A-interface through sending CM service request with the IMSI that is related to the calling party number.

After the ciphering procedure has been completed on the A-interface, the IWF sends SETUP with the called party number. At this stage the IWF is essentially transparent for call control messages. The assigned traffic channel on the A-interface (assignment request) is connected to the previous assigned B-channel on the CCS-interface. An in-band ringing tone is generated by the Mobile Switching Centre MSC.

In FIG. 13b also a CFP originated call establishment is illustrated wherein however the called party is busy. Herein the "user busy" term is generated by the Interworking Function IWF. The A-interface connection is released. Particularly there are two possible normal release sequences in this case. Either the PP goes on hook or the PP stays off hook.

FIGS. 14a, 14b illustrate two examples on CFP terminated call establishments.

In FIG. 14a the called party answers. When the IWF receives a paging message to a Portable Part PP, it checks status for the paged Portable Part PP. If this however is not registered, it ignores the paging message. If it is registered, the Interworking Function IWF responds to the paging.

In FIG. 14b the called party is not reachable. If the Portable Part PP is not reachable, for example out of coverage but still registered, the CFP responds with the call proceeding message. This does not indicate that the Portable Part PP has been reached. When a Portable Part PP has been reached, it is indicated with an alert message. The reception thereof is advantageously supervised by a timer and if this timer expires, the connection will be released.

These examples merely constitute call establishments according to an advantageous embodiment and are shown merely for illustrative and exemplifying purposes and not in a limitative way. Various alternatives are possible.

As already stated above a subscriber of the combined system GSM/DECT, may use either a DECT terminal or a GSM terminal depending on the current location, i.e. if the subscriber is located within a DECT or a GSM coverage area. An incoming call is routed to the system, i.e. the GSM part or the DECT part, where the subscriber currently is registered. This means that the caller always dials the same MSISDN and does not have to know whether the called subscriber currently is within the DECT or within the GSM coverage.

A subscriber of the interconnected system can make outgoing calls both in the DECT system and in the GSM system depending on the current registration.

Advantageously the GSM system comprises dual subscriptions, in this case two IMSI (s) and two MSISDN (s) as already discussed above and the subscriber can be reached either in the GSM or in the DECT system. In an advantageous embodiment one MSISDN is the official MSISDN of the combined system or the GDMS system. This MSISDN is referred to as MSISDN-Go i.e. GSM MSISDN. A calling subscriber has to dial the MSISDN-G in order to call the GDMS. The other MSISDN is referred to as MSISDN-D (D designates DECT) and this is connected to the DECT terminal. This MSISDN is advantageously, as also discussed above, hidden and does not have to be known by the calling subscriber. Furthermore it does not even have to be known by the subscriber. In an advantageous embodiment GSM call forwarding services are used for the forwarding of calls from the MSISDN-G to the MSISDN-D when the GDMS is not reachable and does not answer in the GSM system.

In a particularly advantageous embodiment dual mode terminals are used, i.e. terminals which essentially are a combination of a GSM-terminal MS and a DECT terminal PP.

In the following the call procedure to a GSM/DECT Mobile subscriber is briefly discussed. In the first case the called subscriber is attached and reachable in the GSM system. As referred to above, the calling subscriber dials the MSISDN-G of the subscriber. When the subscriber is reachable, i.e. attached and within coverage the GSM system, the call will be routed to the Mobile Station MS as a normal MS terminating call in the GSM system. On the other hand, the called subscriber may be detached or not reachable in the GSM system. As in the foregoing, the calling subscriber dials the MSISDN-G of the subscriber. When however the subscriber is not reachable or does not reply in the GSM system, the all is forwarded to the MSISDN-D instead. The forwarded call will be routed to the second Mobile Switching Centre/Visitor Location Register MSC/VLR. The second MSC/VLR sets up the call to the DECT terminal. Seen from the second MSC/VLR the call setup is a normal Mobile Station MS terminated call setup. The interworking function IWF thus makes the DECT system appear as a normal GSM Base Station System towards the MSC/VLR.

Calls from the interconnected system can either take the form of a call from a first system or the GSM system, or the second system i.e. in this case, the DECT system. When a GSM/DECT Mobile subscriber makes a call from the GSM system, this is handled as an ordinary GSM MS originating call.

When a subscriber makes a call from the DECT system however, the interworking function IWF makes the call setup appear as an ordinary GSM MS originating call setup to the second Mobile Switching Centre(/Visitor Location Register) MSC/VLR.

The dedicated Operation and Maintenance functionality for the interconnected system, in the described embodiment the GSM/DECT system, is implemented in the interworking function IWF as was more thoroughly discussed in the foregoing. The IWF comprises Operation and Maintenance functions for e.g. the configuration of the DECT terminals PP, the loading of configuration parameters for the interworking function and start and stop of the latter, manual location updating towards the second MSC/VLR and logging and presentation of errors as described more in detail above.

In the foregoing embodiments the first and second system respectively related to the GSM system and the DECT system respectively. This is however merely an example, the invention could likewise be applied to other systems. The second system could e.g. be the CT3 or the "third generation of Cordless Telephony" or the PHP or the Personal Handy Phone. The first system may likewise relate to ADC or PDC which refer to the american and Japanese digital cellular systems respectively. However advantageously the second system is based on the TDMA principle. i.e. the Time Division Multiple Access.

Further examples of a first systems are the PSPDN and the ISDN and the PCS or the Personal Communication System.

As already mentioned above, also analogue systems are possible. It is also not restricted to TDMA-based based systems.

Consequently the particular systems can be any of a number of systems and the interconnected arrangement and the parts thereof can be varied in a number of ways without departing from the scope of the claims.

What is claimed is:

1. Arrangement for interconnecting a first communication system with a number of first terminals and a second communication system with a number of second terminals wherein the second communication system is a cordless access communication system and the first communication system is a cellular mobile communication system comprising at least one Mobile Switching Centre, the interconnecting arrangement comprising an interworking function means, wherein the interworking function means via the existing interface of the first communication system is connected to a second Mobile Switching Centre of the first communication system and via a second interface of the second communication system is connected to said second communication, systems the interworking function means interworks protocols so that the second interface is converted to the existing interface of the first communication, systems and the interworking function provides emulation of a Base Station Subsystem of the first communication system and a first terminal over said existing interface in a non-modified form.

2. Arrangement according to claim 1, whereing the first system is a digital system and the second communication system is a cordless access system.

3. Arrangement according to claim 2, whereing the existing interface is the A-interface.

4. Arrangement according to anyone of the preceding claims, wherein the second interface, the interface of the second system, is a Common Channel Signalling interface.

5. Arrangement according to claim 4 wherein, the second interface or the Common Channel-signalling interface is ported on to a PCM-link for connecting the cordless access system to a PCM interface of the interworking function.

6. Arrangement according to claim 4, wherein the interworking function comprises a user Communication Interface and a Computer Platform comprising an interworking entity module handling the mapping of messages between the A-interface and the second interface particularly the CCS-interface and a Call Control module, a Base Station System Application Part for handling channel allocation and message transfer over the A-interface, and an Operation and Maintenance module.

7. Arrangement according to claim 1, wherein the interworking function via the existing interface is connected to the Visitor Location Register of the second Mobile Switching centre.

8. Arrangement according to claim 1 wherein, both a first (MS;GDMS) and a second terminal (PP;GDMS) provide capability of originating as well as of terminating calls.

9. Arrangement according to claim 1 wherein, the first system comprises dual subscriptions.

10. Arrangement according to claim 8, wherein, the first system comprises two International Mobile Subscriber Identity codes and two Mobile Station Integrated Services Digital Network codes or MSISDN-codes.

11. Arrangement according to claim 10, wherein, the first MSISDN is an external MSISDN of the interconnected communication system whereas the second MSISDN is connected to a second terminal.

12. Arrangement according to claim 11, wherein, the second MSISDN is hidden.

13. Arrangement according to claims 9, the first MSISDN is hidden.

14. Arrangement according to claim 1, wherein, incoming calls to the interconnected communication system are routed to the first or the second system depending on the current location of the subscriber of the interconnected network.

15. Arrangement according to claim 1, wherein, the second system uses the first system for switching and routing functionality.

16. Arrangement according to claim 1, wherein, the first system is the GSM-system and the second system is the Digital European Cordless Telecommunication system.

17. Arrangement according to claim 16, wherein, the first and the second terminals are GSM terminals and/or DECT terminals respectively.

18. Arrangement according to claim 1, wherein, at least one first and/or second terminal is a dual mode terminal.

19. Arrangement according to claim 1, wherein it is used for roaming between different sites of the second system and/or for roaming between the first system and the second system.

20. Arrangement according to claim 1, wherein, it is used for handover between different sites of the second system.

21. Arrangement according to claim 1, wherein, it is used for handover between the first system and the second system and in that at least some of the first and second terminals are dual mode terminals.

22. Cellular mobile communication system comprising a first cellular mobile communication system and a second cordless access communication system which are interconnected via a interworking function means, wherein the interworking function means via the existing interface of the first communication system is connected to a Mobile Switching Centre of the first system and via a second interface of the second system is connected to said second system, the second interface is interworked with the existing first interface in the interworking function means, the existing interface requiring no modification and the interworking function provides emulation of a Base Station Subsystem of the cellular communication system and a first terminal over said existing interface.

23. Communication system according to claim 22, wherein, the first communication system is the GSM-system and the second communication system is the DECT-system and in that the existing interface is the GSM A-interface.

24. Communication system according to claim 22, wherein, the first system is any cellular system such as e.g. ADC, PDC, PSPDN, PCS, NMT, AMPS or TACS etc.

25. Communication system comprising a first cellular mobile communication system and at least one second cordless access communication system wherein the first and the second systems are interconnected via interworking function means, and the second interface of the second system is converted to an unmodified existing first interface of the first system in the interworking function means and the interworking function provides emulation of a Base Station Subsystem of the cellular communication system over said existing interface.

26. Communication system according to claim 25 wherein the first system is the GSM-system and the second system is the DECT system and wherein the existing interface is the A-interface of GSM.

27. Communication system according to claim 25 or comprising a number of terminals wherein at least some of the terminals of the system are so called dual mode terminals having the function of both a terminal as normally used in the first system and a terminal as normally used in the second system.

28. Cordless access communication system which is interconnected to a cellular mobile communication system wherein an interface of the cordless system via protocol conversion is interworked with an existing interface of the cellular mobile communication system via an interworking function means arranged in the fixed part(s) of the cordless system the interworking function providing emulation of a Base Station Subsystem of the first communication system without modification of the existing interface of the first system.

* * * * *